United States Patent
Miller et al.

(10) Patent No.: US 8,885,291 B2
(45) Date of Patent: Nov. 11, 2014

(54) RECIRCULATION FILTER FOR AN ELECTRONIC ENCLOSURE

(71) Applicant: Donaldson Company, Inc., Minneapolis, MN (US)

(72) Inventors: Stanley B. Miller, Eden Prairie, MN (US); Allen N. Nicklay, Eden Prairie, MN (US); Christopher J. Fischer, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/831,458

(22) Filed: Mar. 14, 2013

(65) Prior Publication Data

US 2014/0043711 A1 Feb. 13, 2014

Related U.S. Application Data

(60) Provisional application No. 61/681,618, filed on Aug. 10, 2012.

(51) Int. Cl.
*G11B 33/14* (2006.01)
*B01D 46/00* (2006.01)
*B01D 46/24* (2006.01)

(52) U.S. Cl.
CPC .......... *G11B 33/146* (2013.01); *B01D 46/0032* (2013.01); *B01D 2279/45* (2013.01); *B01D 46/24* (2013.01)
USPC ...................................................... 360/97.16

(58) Field of Classification Search
USPC .......... 360/97.16, 97.14, 97.13, 97.15, 97.19, 360/99.15, 99.23, 99.13, 99.22
See application file for complete search history.

(56) References Cited

U.S. PATENT DOCUMENTS

| | | | |
|---|---|---|---|
| 4,418,369 A | 11/1983 | Applequist et al. |
| 4,488,193 A | 12/1984 | Davis et al. |
| 4,581,668 A | 4/1986 | Campbell |
| 4,594,626 A | 6/1986 | Frangesh |
| 4,725,904 A | 2/1988 | Dalziel |
| 4,809,102 A | 2/1989 | Hatchett et al. |
| 4,857,087 A | 8/1989 | Bolton et al. |
| 5,025,337 A | 6/1991 | Brooks |
| 5,030,260 A | 7/1991 | Beck et al. |
| 5,406,431 A | 4/1995 | Beecroft |
| 5,417,743 A | 5/1995 | Dauber |
| 5,538,545 A | 7/1996 | Dauber et al. |

(Continued)

FOREIGN PATENT DOCUMENTS

| | | |
|---|---|---|
| EP | 0123130 | 10/1984 |
| EP | 0263932 | 4/1988 |

(Continued)

OTHER PUBLICATIONS

International Search Report and Written Opinion for PCT/US2013/054446, mailed Dec. 11, 2013 (17 pages).

*Primary Examiner* — Allen T Cao
(74) *Attorney, Agent, or Firm* — Pauly, Devries Smith & Deffner, LLC

(57) ABSTRACT

A filter assembly for use in an electronic enclosure is provided. The filter assembly includes a highly permeable scrim that defines an elongate enclosure with an inlet at a first end and a closed second end, wherein an electrostatic filtration media is disposed within the elongate enclosure.

20 Claims, 16 Drawing Sheets

(56) References Cited

U.S. PATENT DOCUMENTS

| | | | |
|---|---|---|---|
| 5,539,595 A | 7/1996 | Beck et al. | |
| 5,593,482 A | 1/1997 | Dauber et al. | |
| 5,594,600 A | 1/1997 | Bruner et al. | |
| 5,615,070 A | 3/1997 | Bordes | |
| 5,696,649 A | 12/1997 | Boutaghou | |
| 5,739,980 A | 4/1998 | Brooks | |
| 5,754,365 A | 5/1998 | Beck et al. | |
| 5,872,678 A * | 2/1999 | Boigenzahn et al. | 360/97.13 |
| 5,872,679 A | 2/1999 | Boigenzahn et al. | |
| 5,997,618 A | 12/1999 | Schneider et al. | |
| 6,077,335 A | 6/2000 | Schneider et al. | |
| 6,208,484 B1 | 3/2001 | Voights | |
| 6,217,637 B1 | 4/2001 | Toney et al. | |
| 6,238,467 B1 | 5/2001 | Azarian et al. | |
| 6,285,524 B1 | 9/2001 | Boigenzahn et al. | |
| 6,296,691 B1 * | 10/2001 | Gidumal | 96/17 |
| 6,395,073 B1 * | 5/2002 | Dauber | 96/134 |
| 6,475,269 B1 | 11/2002 | Turner | |
| 6,557,240 B1 | 5/2003 | Voights | |
| 6,831,830 B2 | 12/2004 | Bruner et al. | |
| 6,876,514 B1 | 4/2005 | Little | |
| 6,926,761 B2 | 8/2005 | Johnson et al. | |
| 6,936,093 B2 | 8/2005 | Isogawa et al. | |
| 7,012,782 B2 | 3/2006 | Albrecht et al. | |
| 7,019,941 B2 | 3/2006 | Yoo | |
| 7,095,584 B2 | 8/2006 | Logan | |
| 7,113,402 B2 | 9/2006 | Rutledge et al. | |
| 7,166,142 B2 | 1/2007 | Tuma et al. | |
| 7,291,208 B2 * | 11/2007 | Dauber et al. | 96/134 |
| 7,295,398 B2 | 11/2007 | McMaster et al. | |
| 7,306,659 B2 | 12/2007 | Gorton et al. | |
| 7,312,950 B2 * | 12/2007 | Voights et al. | 360/97.14 |
| 7,318,859 B2 | 1/2008 | Ball et al. | |
| 7,382,572 B1 * | 6/2008 | Turner et al. | 360/97.16 |
| 7,388,731 B1 | 6/2008 | Little et al. | |
| 7,404,836 B2 | 7/2008 | Garikipati et al. | |
| 7,525,802 B2 | 4/2009 | Yu et al. | |
| 7,569,089 B2 | 8/2009 | Avina | |
| 7,573,672 B2 | 8/2009 | Han et al. | |
| 7,591,868 B2 * | 9/2009 | Johnson | 55/385.6 |
| 7,601,192 B2 | 10/2009 | Boulay et al. | |
| 7,652,843 B2 | 1/2010 | Albrecht et al. | |
| 7,667,924 B2 | 2/2010 | Han et al. | |
| 7,686,871 B2 | 3/2010 | Oh et al. | |
| 7,727,297 B2 * | 6/2010 | Dauber et al. | 55/385.6 |
| 8,016,917 B2 | 9/2011 | Avina | |
| 8,102,619 B2 * | 1/2012 | Chan et al. | 360/97.16 |
| 8,116,029 B2 | 2/2012 | Miller, III | |
| 8,263,214 B2 | 9/2012 | Kalayci et al. | |
| 8,303,806 B2 | 11/2012 | Mohseni et al. | |
| 8,585,793 B2 * | 11/2013 | Bishop et al. | 55/486 |
| 8,638,524 B2 * | 1/2014 | Brown | 360/97.17 |
| 2004/0159603 A1 | 8/2004 | Boulnois et al. | |
| 2004/0168575 A1 | 9/2004 | Isogawa et al. | |
| 2004/0231518 A1 | 11/2004 | Johnson et al. | |
| 2005/0047001 A1 | 3/2005 | Logan | |
| 2005/0139078 A1 | 6/2005 | Tuma et al. | |
| 2005/0185327 A1 * | 8/2005 | Voights et al. | 360/97.03 |
| 2006/0191249 A1 | 8/2006 | Gogins et al. | |
| 2006/0272507 A1 | 12/2006 | Johnson | |
| 2007/0103811 A1 | 5/2007 | Olszewski | |
| 2007/0283809 A1 | 12/2007 | Boulay et al. | |
| 2009/0090245 A1 | 4/2009 | Olszewski | |
| 2009/0183475 A1 | 7/2009 | Dauber et al. | |
| 2013/0088795 A1 * | 4/2013 | Brown | 360/97.14 |

FOREIGN PATENT DOCUMENTS

| | | |
|---|---|---|
| EP | 0391555 | 10/1990 |
| EP | 0692788 | 1/1996 |
| EP | 0744747 | 11/1996 |
| GB | 2024495 | 1/1980 |
| GB | 2202076 | 9/1988 |
| GB | 2275811 | 9/1994 |
| WO | 9114496 | 10/1991 |
| WO | 9519831 | 7/1995 |
| WO | 9614136 | 5/1996 |
| WO | 9904884 | 2/1999 |
| WO | 0114041 | 3/2001 |
| WO | 0122421 | 3/2001 |
| WO | 0122422 | 3/2001 |
| WO | 2004077895 | 9/2004 |
| WO | 2004105038 | 12/2004 |
| WO | 2006020932 | 2/2006 |
| WO | 2006044521 | 4/2006 |
| WO | 2006046996 | 5/2006 |
| WO | 2006050562 | 5/2006 |
| WO | 2006053046 | 5/2006 |
| WO | 2006084106 | 8/2006 |
| WO | 2007005084 | 1/2007 |
| WO | 2007081828 | 7/2007 |
| WO | 2007145774 | 12/2007 |
| WO | 2008112250 | 9/2008 |
| WO | 2008113021 | 9/2008 |
| WO | 2009094138 | 7/2009 |
| WO | 2010036351 | 4/2010 |
| WO | 2010091388 | 8/2010 |

* cited by examiner

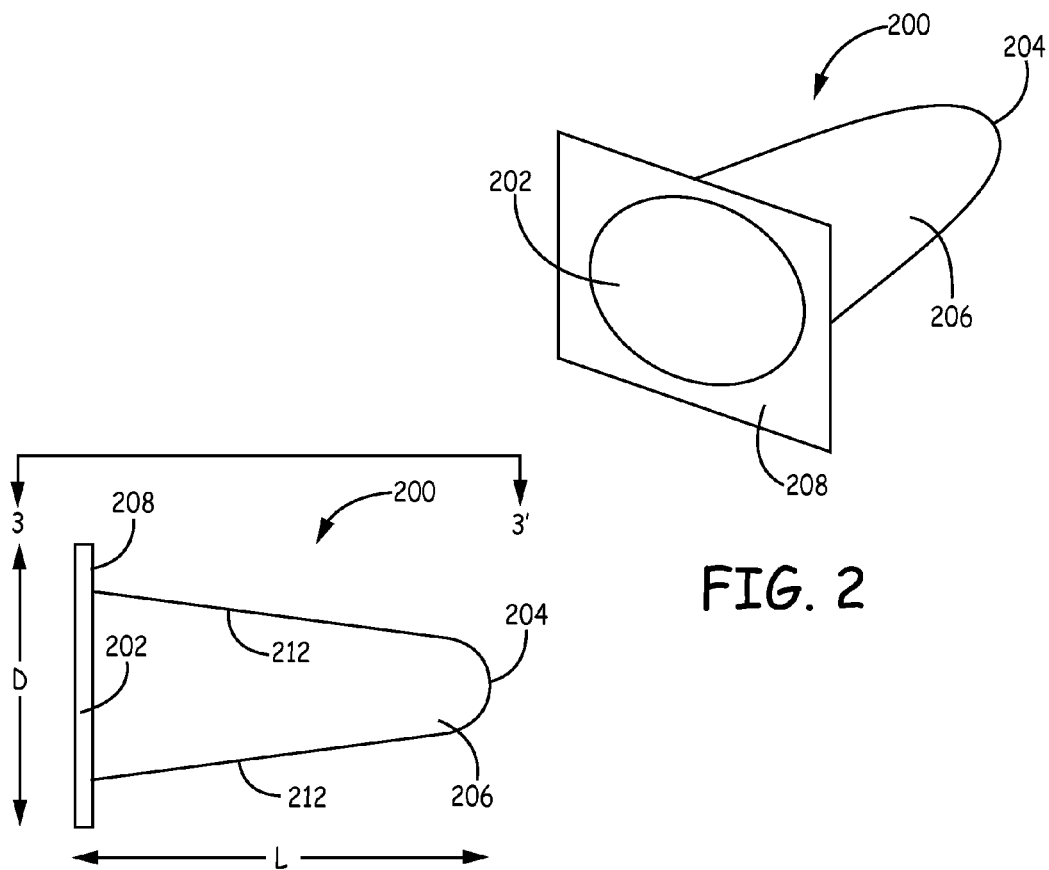
FIG. 2
FIG. 3
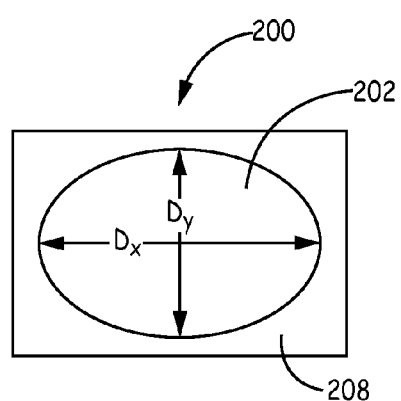
FIG. 4

RECIRCULATION FILTER FOR AN ELECTRONIC ENCLOSURE

FIELD OF THE INVENTION

The present invention is directed to filters for use in electronic enclosures. In particular, the invention is directed to filters for removing contaminants circulating within the interior of an electronic enclosure.

BACKGROUND

Contaminants within an electronic enclosure, such as a hard disk drive enclosure, can reduce the efficiency and longevity of the components within the enclosure. Contaminants can include chemicals and particulates, and can enter the hard drive enclosure from external sources, or be generated within the enclosure during manufacture or use. The contaminants can gradually damage the drive, resulting in deterioration of drive performance and even complete failure of the drive. Consequently, data storage systems such as hard disk drives typically include one or more filters capable of removing or preventing entry of particulate and/or chemical contaminants in the air within the disk drive enclosure. One type of such filter is a recirculation filter, which is generally placed such that it can filter out contaminants from the path of airflow caused by rotation of one or more disks within the disk drive. Although existing recirculation filters can remove many contaminants, a need exists for improved performance at removing certain contaminants, in particular, large particulate contaminants.

SUMMARY OF THE INVENTION

The present application is directed, in part, to filter assemblies for use in an electronic enclosure. The filter assemblies are designed to remove particulate contaminants circulating within the electronic enclosure. In particular, the filter assemblies are constructed and arranged so as to effectively reduce the particulate contaminant levels by capturing the particles and preventing their release back into the electronic enclosure. Typically the filter assemblies are constructed with a media geometry that aids in the capture of particles, and which avoids reflection of particles out of the filter assemblies.

The filter assemblies further include, in various embodiments, media configurations that are further designed to promote the capture of particulate contaminants. These media configurations include, for example, constructions with an electrostatic media overlaying all or part of a scrim material on the interior of the filter assembly. Without intending to be bound by a specific mechanism of operation, it is believed that the electrostatic helps prevent particles from striking the media and then bouncing off (often referred to as reflection), which can otherwise occur with exposed scrim materials. The electrostatic may also further help in capturing the particles to prevent their continued circulation through the electronic enclosure.

In an example embodiment, the filter assembly includes a media structure that includes an open front end, a closed rear end, and an internal recess between the open front end and closed rear end. Permeable filter media forms at least a portion of the recess. The recess is typically relatively deep, in some cases as deep or deeper than the width of the filter assembly. Thus, the recess can be conical or column shaped (for example) in some embodiments. This recirculation filter structure with an internal recess promotes the capture and retention of particulate contaminants by having a large open front surface area while having an even larger interior surface area comprising filter media. The interior media surface is generally angled relative to the air flow direction so that particles hit the media at an acute angle such that they can either be retained by the media at the point of initial contact or slowed down sufficiently to be retained deeper inside the filter assembly.

In some implementations at least 50 percent of the surface area of the internal recess has an angle to the opening that is less than or equal to 45 degrees. At least 75 percent of the surface area of the internal recess has an angle to the opening that is less than or equal to 45 degrees in some example implementations. Optionally at least 50 percent of the surface area of the internal recess has an angle to the opening that is less than or equal to 30 degrees. In some example embodiments at least 75 percent of the surface area of the internal recess has an angle to the opening that is less than or equal to 30 degrees.

In certain implementations the internal recess of the filter assembly has a ratio of maximum depth to maximum diameter of the open front face of at least 1.0, but this maximum depth to maximum diameter ratio can vary, and is often higher than 1.0, such as higher than 1.25, 1.5, 1.75; or 2.0, for example. The internal recess of the filter assembly can have an internal surface area that is at least 2 times the area at the open front face, in other implementations at least 3 times the area at the open front face, and in other implementations at least 4 times the area at the open front face, at least 4 times the area of the open face in some implementations, or at least 5 or 6 times the area at the open front face in certain embodiments.

In some embodiments, the permeable scrim material comprises woven or non-woven material, such as polypropylene fibers. The scrim material can have, for example, a permeability of between about 100 ft./min. at 0.5 inches of water and about 800 ft./min. at 0.5 inches of water in some embodiments. In certain embodiments the scrim material has a permeability of between about 250 ft./min. at 0.5 inches of water and about 600 ft./min. at 0.5 inches of water. The scrim material has a permeability of between about 300 ft./min. at 0.5 inches of water and about 500 ft./min. at 0.5 inches of water in some example implementations. It will be understood that suitable scrim material can have, for example, a permeability of more than 100 ft./min. at 0.5 inches of water; more than 250 ft./min. at 0.5 inches of water; or more than 300 ft./min. at 0.5 inches of water. Suitable scrim material can have, for example, a permeability of less than about 800 ft./min. at 0.5 inches of water in some embodiments; less than 600 ft./min. at 0.5 inches of water in some embodiments; or less than 500 ft./min. at 0.5 inches of water in some embodiments.

The electrostatic material can contain various fibers, and is optionally a mixed fiber media comprising polypropylene and acrylic fibers. The electrostatic material has, for example, a permeability of between about 250 ft./min. at 0.5 inches of water and about 750 ft./min. at 0.5 inches of water. The electrostatic material can have a filtering efficiency of about 20% to about 99.99% for 20 to 30 micron particulate contaminants in some embodiments. Suitable electrostatic can, for example, have a filtering efficiency of greater than 20% for 20 to 30 micron particulate contaminants; greater than 40% for 20 to 30 micron particulate contaminants; or greater than 60% for 20 to 30 micron particulate contaminants. The electrostatic material can have in some example implementations a filtering efficiency of less than 99.99% for 20 to 30 micron particulate contaminants; less than 80% for 20 to 30 micron particulate contaminants; or less than 60% for 20 to 30 micron particulate contaminants.

The above summary of the present invention is not intended to describe each discussed embodiment of the present invention. This is the purpose of the figures and the detailed description that follows.

BRIEF DESCRIPTION OF THE DRAWINGS

The invention will be more fully explained with reference to the following drawings.

FIG. 2 is a perspective view of a filter assembly constructed and arranged in accordance with an implementation of the invention.

FIG. 3 is a side elevation view of a filter assembly constructed and arranged in accordance with the implementation of the invention shown in FIG. 2.

FIG. 4 is a front elevational view of a filter assembly constructed and arranged in accordance with the implementation of the invention shown in FIG. 2.

DETAILED DESCRIPTION

Figure 1:
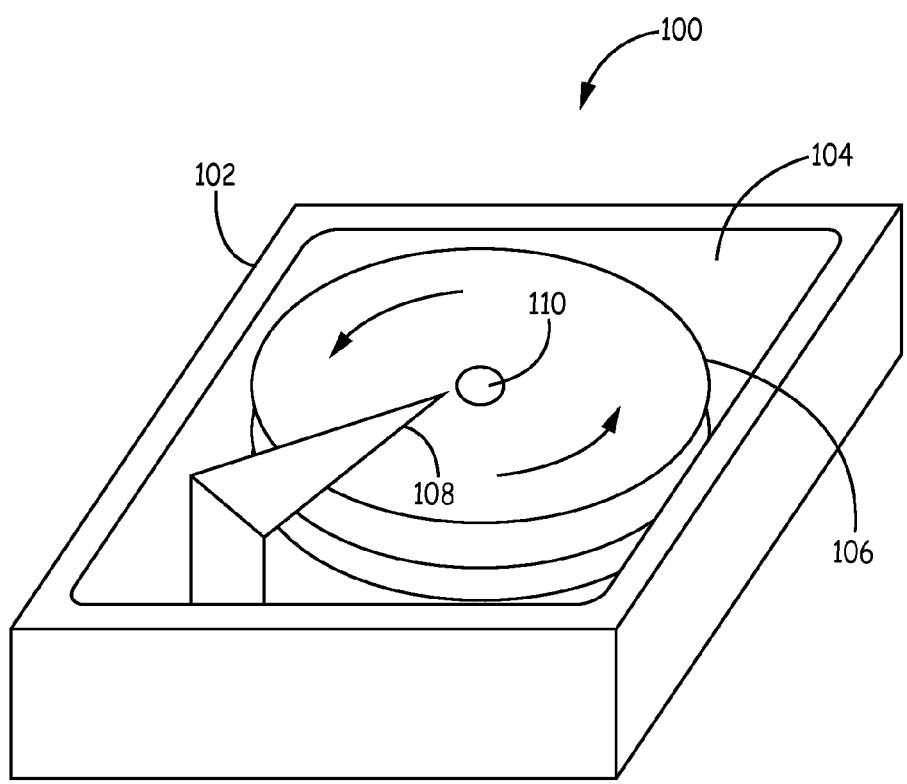
FIG. 1 is a simplified perspective view of a disk drive assembly, showing the top of the disk drive assembly removed.

Various filtering systems are known that are used to reduce or remove contaminants from disk drive assemblies, as well as other electronic enclosures. In particular, recirculation filters are often used to reduce or remove particulate and/or chemical contaminants that have entered a disk drive enclosure or been generated during use of the disk drive. A typical recirculation filter includes a filter element that is positioned in the path of air currents induced by disk rotation such that contaminants present in the air current are subject to filtration.

However, not all particles that come into contact with the filter are successfully captured. The face velocity of many available filter assemblies is very high, which can increase particle momentum. The high momentum can result in particulate contaminants "reflecting" or "bouncing" off the filter surface, rather than being entrapped by the filter. This phenomenon can be referred to as "particle bounce." Exposed scrim material, which makes up the surface of many existing recirculation filters, can be a particular problem because particles bounce off the scrim fibers at relatively high rates. Thus, a need exists for an improved recirculation filter that can capture even particulate contaminants having relatively high momentum.

A filter assembly for use in an electronic enclosure is described herein to provide improved particulate contaminant removal. In an example embodiment, the filter assembly includes a media structure having an open front face, a closed rear face, and an internal recess between the open front face and closed rear face. A permeable scrim material can form at least a portion of the media structure. An electrostatic material is disposed within the internal recess of the filter assembly, the electrostatic material at least partially covering the permeable scrim. In an example embodiment the electrostatic material will overlay all or most of the permeable scrim. In some embodiments the electrostatic material and scrim are combined together before production of the filter assembly (such as, for example, by lamination, heat bonding, or light calendaring) and subsequently formed into a media structure that creates at least a portion of the filter assembly.

In certain implementations the internal recess of the filter assembly has a ratio of maximum depth to maximum diameter of the open front face of at least 1.0, but this maximum depth to maximum diameter ratio can vary, and is often higher than 1.0, such as 1.25, 1.5, 1.75; or 2.0, for example. The internal recess of the filter assembly can have an internal surface area that is at least 2 times the area at the open front face, in other implementations at least 3 times the area at the open front face, and in other implementations at least 4 times the area at the open front face, or at least 5 or 6 times the area at the open front face.

In some embodiments, the permeable scrim material comprises woven or non-woven material, such as polypropylene fibers. The scrim material can have, for example, a permeability of between about 100 ft./min. at 0.5 inches of water and about 800 ft./min. at 0.5 inches of water in some embodiments. In some embodiments the scrim material has a permeability of about 250 ft./min. at 0.5 inches of water and about 600 ft./min. at 0.5 inches of water. In yet other implementations the scrim material has a permeability of about 300 ft./min. at 0.5 inches of water and about 500 ft./min at 0.5 inches of water, It will be understood that suitable scrim material can have, for example, a permeability of more than 100 ft./min. at 0.5 inches of water; more than 250 ft./min. at 0.5 inches of water; or more than 300 ft./min. at 0.5 inches of water. Suitable scrim material can have, for example, a permeability of less than about 800 ft./min. at 0.5 inches of water in some embodiments; less than 600 ft./min. at 0.5 inches of water in some embodiments; or less than 500 ft./min. at 0.5 inches of water in some embodiments.

The electrostatic material can contain various fibers, and is optionally a mixed fiber media comprising polypropylene and acrylic fibers. The electrostatic material has, for example, a permeability of between about 250 ft./min. at 0.5 inches of water and about 750 ft./min. at 0.5 inches of water. The electrostatic can have a filtering efficiency of about 20% to about 99.99% for 20 to 30 micron particulate contaminants in some embodiments. Suitable electrostatic can, for example, have a filtering efficiency of greater than 20% for 20 to 30 micron particulate contaminants; greater than 40% for 20 to 30 micron particulate contaminants; or greater than 60% for 20 to 30 micron particulate contaminants. The electrostatic can have in some example implementations a filtering efficiency of less than 99.99% for 20 to 30 micron particulate contaminants; less than 80% for 20 to 30 micron particulate contaminants; or less than 60% for 20 to 30 micron particulate contaminants.

Now, in reference to the drawings, FIG. 1 is a simplified perspective representation of a disk drive 100. The disk drive 100 includes body 102 that forms an enclosure 104. In an example embodiment, one or more rotatable magnetic disks 106 are positioned within the enclosure 104. The rotation of the drive is shown by arrows (although opposite rotation is alternatively possible). Other disk drive components, such as a read-write head and wiring can be incorporated into an armature 108.

An example embodiment of a filter assembly 200 is shown in FIGS. 2, 3 and 4. As shown in FIG. 2, the filter assembly comprises an open front end 202, and a closed rear end 204. The filter assembly 200 includes an elongate media structure 206 between the front end 202 and rear end 204, the elongate media structure 206 being primarily made of filter media, such as in an example embodiment, a scrim on one side with an electrostatic material on the other side. Preferably the electrostatic media is located on the interior side of the elongate media structure 206. Sidewalls forming the elongate media structure extend from the open front end 202 to the closed rear end 204. In the implementation shown, the elongate media structure 206 is secured to a frame 208. The frame 208 can be, for example, a metal or plastic support that secures the media structure 206 and may aid in installation into an electronic enclosure.

This example filter assembly 200 is also shown in FIG. 3, in side elevational view, and in FIG. 4 in front view (taken from the front end 202). Measurement of the diameter "D" of the filter assembly 200 is taken along the open interior of the filter assembly 200 at the front end 202. The opening can be generally circular as shown in FIG. 2. In the alternative, the opening can be oval shaped, otherwise non-circular, and rectangular or otherwise the approximate shape of a polygon, for example. In many embodiments, however, the opening will be circular, semi-circular, ovular, semi-ovular, or otherwise have a generally rounded front opening. This generally rounded front opening allows for ease of manufacture of the filter assembly 200.

In FIG. 4, two diameters are shown: $D_x$ and $D_y$. $D_x$ refers to the longest diameter across the open front end 202, and $D_y$ refers to a diameter at the open front end 202 that is perpendicular to $D_x$. Diameter of non-circular openings can be measured by taking an average diameter (such as by averaging the $D_x$ and $D_y$ diameters), or by measuring a maximum diameter, such as $D_x$. In general, at least one of $D_x$ and $D_y$ is between about 0.25 and about 1 inches. Generally the length "L", shown in FIG. 2, of the filter assembly 200 is greater than the diameter of the filter assembly 200. Specifically, the length L is typically longer than the longer of $D_x$ and $D_y$. In some implementations length L is longer than the average of $D_x$ and $D_y$. In one embodiment, the length "L" of the filter assembly 200 can be at least 1.5, 2, or 3 times the longer of the diameters $D_x$ and $D_y$ of the filter assembly. The length L can be, for example, between about 0.25 and about 2 inches.

The open front end 202 is generally positioned upstream from the closed rear end 204 with respect to airflow within the electronic enclosure. The elongate shape of the filter assembly 200, in particular the elongate media structure 206, increases the surface area of filtration media to which the airflow is exposed, thereby increasing the amount of particles that are captured by the filter assembly 200 during filtration, as well as entrapping particles with higher mass or momentum. Furthermore, the construction of the filter assembly, with a large front opening, and an even larger media surface area in the elongate media structure 206, reduces pressure restriction of the filter assembly 200.

In an example embodiment, the filter assembly 200 has a substantially cylindrical configuration. As used herein, the term "substantially cylindrical" means that the front end 202 and rear end 204 of the filter assembly are substantially circular and the sidewalls 212 (FIG. 3) of the filter assembly 200 are parallel or substantially parallel. In another embodiment, the filter assembly 200 has a substantially conical or parabolic configuration. As used herein, the term "substantially conical" or "substantially parabolic" means that the open front end 202 converges towards the closed rear 204 end of the filter assembly 200. Other filter assembly configurations are also possible, in particular other elongate configurations having an ovoid, square, rectangular or other cross-sectional shape either with or without converging sidewalls, and would fall within the scope of the invention.

While not wishing to be bound by theory, it is believed that the use of an open filtration construction with large media surface area reduces surface velocity of the particulate contaminants and can thereby increase particle capture. In an example embodiment, the filtration media has a 20 micron to 30 micron filtering efficiency of about 20% to about 99.99%. The permeability of the filtration media is generally between about 250 ft./min. at 0.5 inches of water and about 750 ft./min. at 0.5 inches of water. The basis weight is generally between about 45 gm/m$^2$ and about 165 gm/m$^2$.

Figure 5A:
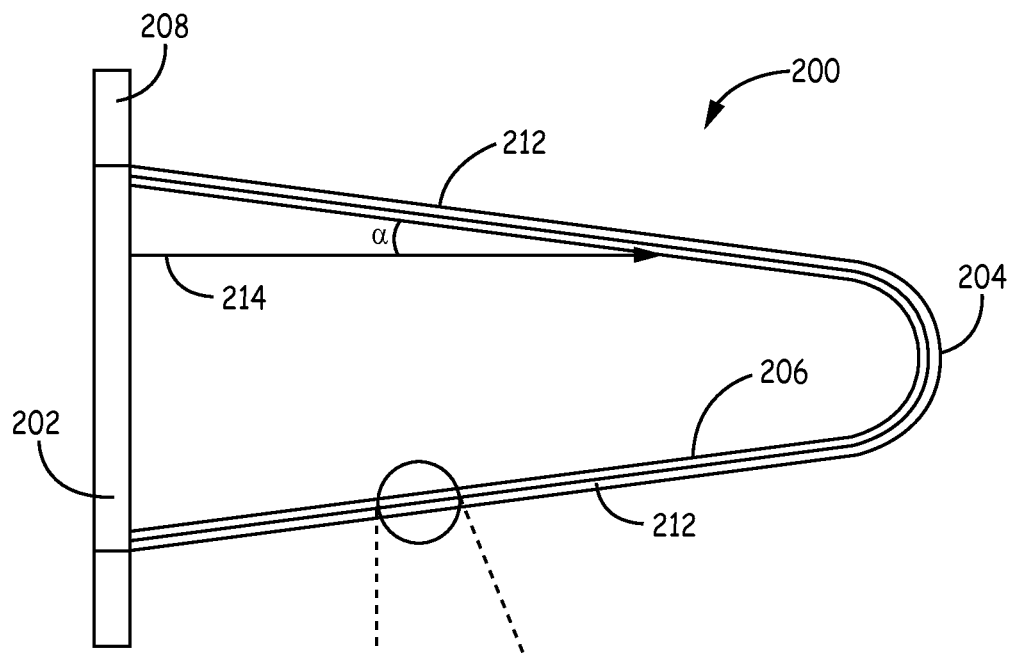
FIG. 5A is a cross-sectional view of the filter assembly of FIG. 3 taken along line 3-3'.
Figure 5B:
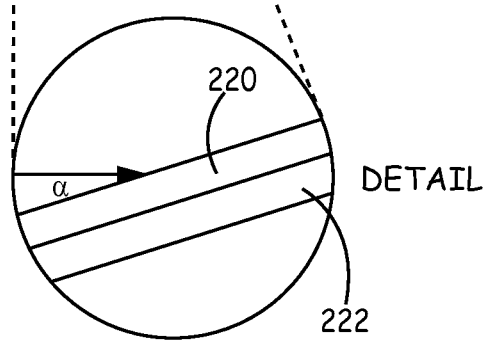
FIG. 5B is a detail of a portion of the filter assembly shown in cross section in FIG. 5A, showing the media layers.

FIG. 5A shows a cross section of the filter assembly 200 of FIGS. 2 to 4. FIG. 5A shows the angle alpha between the side wall 212 and a line 214 perpendicular to the front end 202 of the filter assembly 200, corresponding to the path of a particle flowing perpendicular to the front end 202 of the filter assembly. This angle alpha is typically less than 45 degrees over the majority of the sidewall forming the elongate member 206, and alternatively less than 30 degrees or less than 15 degrees over the majority of the media. FIG. 5B shows a simplified enlarged view of a cross section of the filter assembly, showing an electrostatic layer 220 and a support layer 222 (such as a scrim layer). The line 214 at angle alpha is also shown, depicting the relatively acute angle (e.g. preferably less than 45 degrees) at which particles that are travelling perpendicular to the opening will strike the media. In the alternative, the media forming the filter assembly 200 can be formed of a single layer, or more than two layers. Also, in certain embodiments a portion of the media is single layer, and a portion of the media has more than one layer.

In one embodiment, the filtration media forming the elongate portion 206 includes electrostatic fibers. The term "electrostatic fibers," as used herein, refers to fibers that contain an electric charge. One advantage of including electrostatic fibers in the filter assembly 200 is that the filter is not only able to mechanically trap contaminants, but is also able to exert an electrostatic force on contaminants that contain electric charges, thereby increasing the amount of contaminants that are removed from the airstream. The electrostatic media can be triboelectric media, electret media, or any other media that can be charged, or that depends on charging as the main mechanism for particle removal. In example embodiments, the electrostatic media include triboelectric fibers. Triboelectric fibers are known and can be formed, for example, using a mixture of (1) polyolefin fibers such as polyethylene, polypropylene or ethylene and propylene copolymers, with (2) fibers of another polymer, for example, fibers containing hydrocarbon functions substituted by halogen atoms, such as chlorine or polyacrylonitrile fibers. In general, the polyolefin fibers and the other polymer fibers are included in the electrostatic media at a weight ratio between about 60:40 or about 20:80 or about 30:70.

Figure 6:
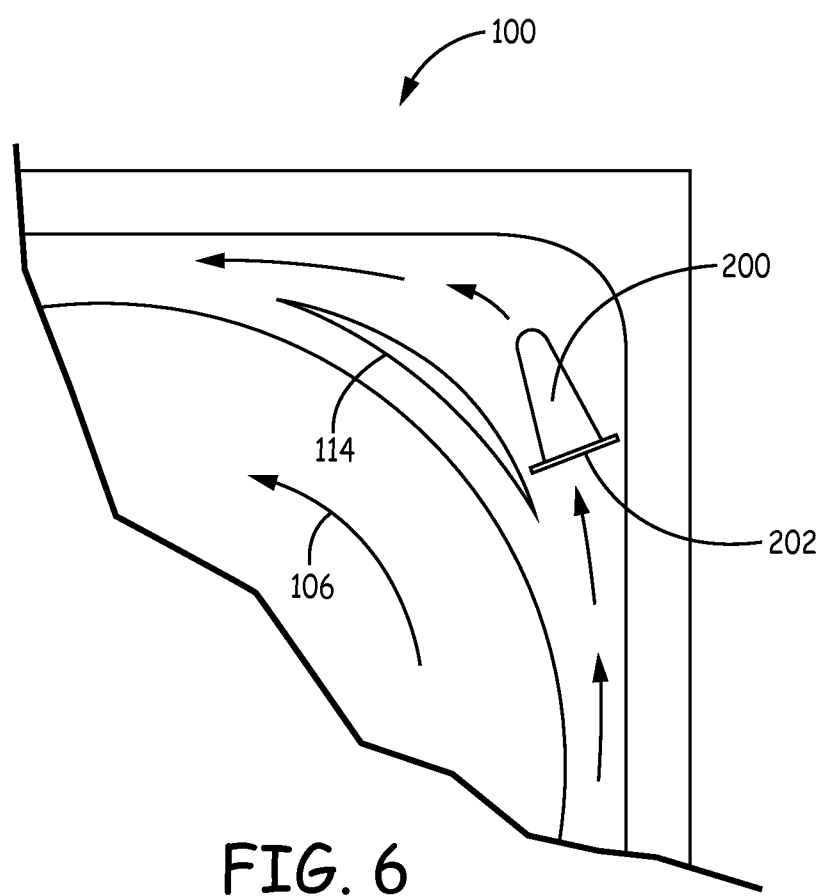
FIG. 6 is a partial top plan view of disk drive assembly containing a filter assembly constructed and arranged in accordance with an example implementation of the present invention.

FIG. 6 shows a filter assembly 200 installed within an electronic enclosure 100 (only a corner of the enclosure 100 is depicted). The filter assembly 200 is oriented so that the open front end 202 is directed toward the air stream generated by the rotating disk 106 (depicted directionally by arrows). In the embodiment shown, a baffle 114 is present to aid in the direction of air into the open front end 202 of the filter assembly 200. The filter assembly 200 can be placed within the electronic enclosure such that the baffle 114 directs air into and through the open front end 202. In certain implementations the baffle 114, along with any mounting elements (such as a frame 208 shown in FIG. 2) or other portions of the housing form a channel that directs air into the open front end 202. In other implementations the filter assembly 200 is positioned in a flowing air stream without a channel directing air into it, or only an open sided channel that only partially directs air into the filter assembly 200.

Figure 7A:
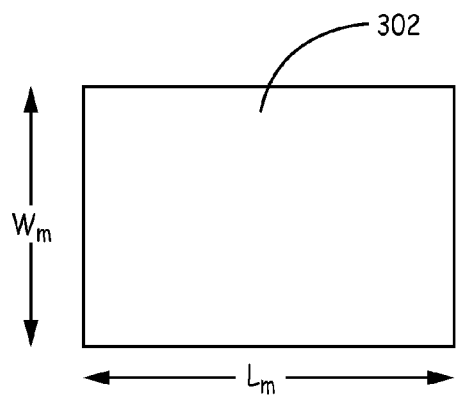
FIGS. 7A-7D are schematic depictions showing a method of making a filter assembly as described herein.
Figure 7B:
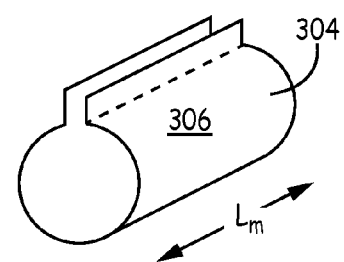
Figure 7C:
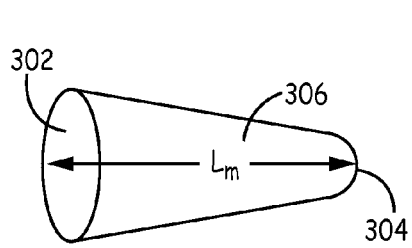
Figure 7D:
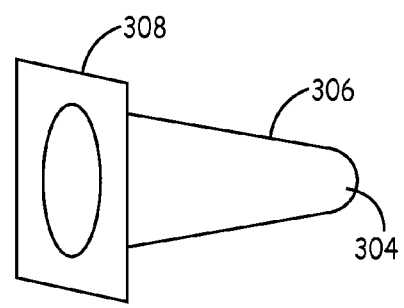

One method for making a filter assembly as described herein is shown schematically in FIG. 7A to 7D. In this method, a sheet of scrim material 302 having a length "$L_m$" and a width "$W_m$" is provided (FIG. 7A). The scrim material 302 is rolled along an axis substantially parallel to the length $L_m$ of the scrim to form a cylindrical or conical article 306 (FIG. 7B). The scrim 302 is sealed along the length $L_m$ of the article, for example, using an adhesive or by welding. An end 304 of the article is then sealed to form a closed article that defines a chamber having a length "$L_A$" (FIG. 7C). The opposite end 302 is then adhered to a frame 308, for example, using an adhesive, or by welding (FIG. 7D) and a filtration media, for example, an electrostatic filtration media is introduced into the interior of the elongate member formed by the process.

Figure 8:
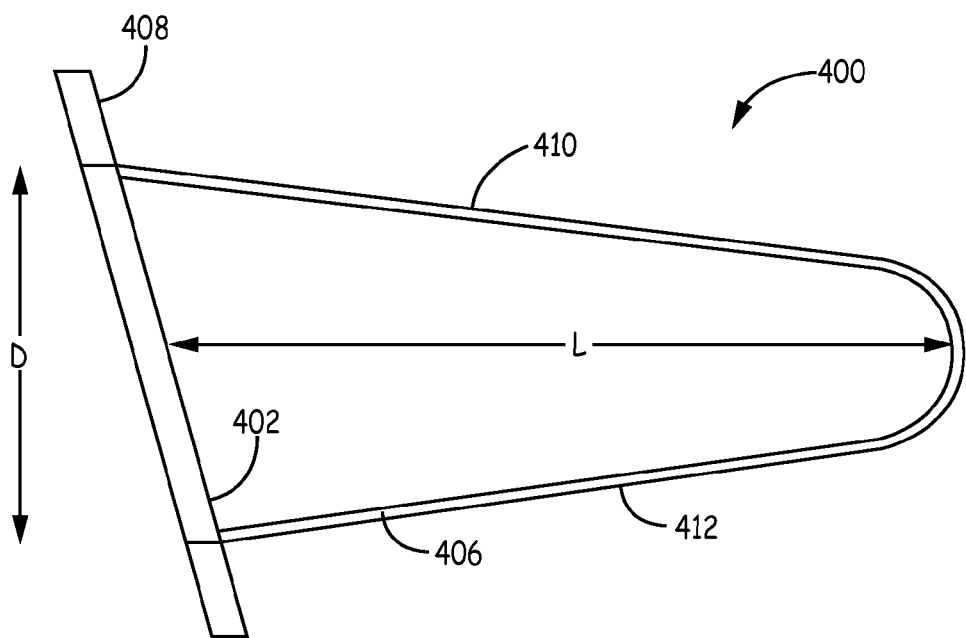
FIG. 8 is a cross sectional view of a filter assembly made in accordance with an implementation of the invention, the filter assembly having an inclined opening.

FIG. 8 is a cross sectional view of a filter assembly 400 made in accordance with an alternative implementation of the invention, the filter assembly having an inclined opening 402 secured to a frame 408. Media is configured in an elongate member 406. The filter assembly 400 has a length "L" measured from the middle of the opening, and diameter "D". The overall configuration and performance is similar to that of assembly 200 discussed above, only the open end 402 and frame 408 are angled relative to the elongate media member 406. Also, the filter assembly 400 has sidewalls 410 and 412 of different lengths from one another.

Figure 9:
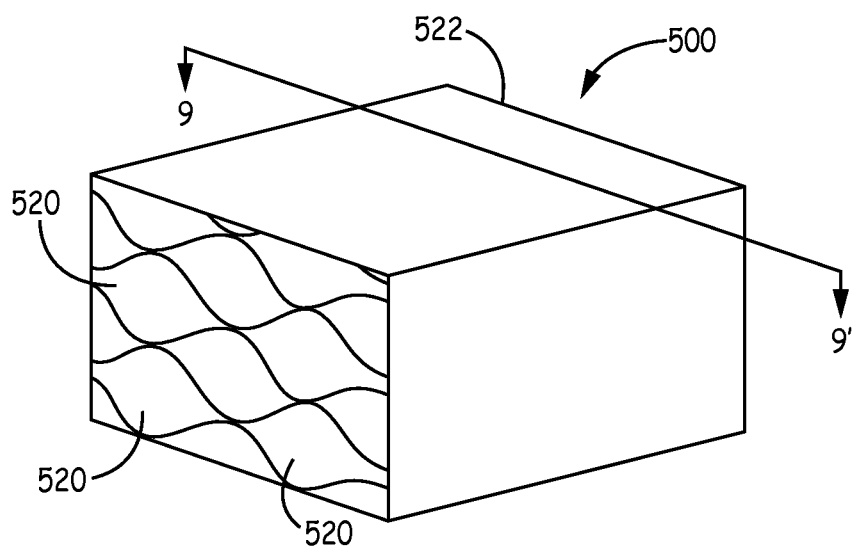
FIG. 9 is a perspective view of a filter assembly made in accordance with an implementation of the invention, the filter assembly having a plurality of filtration recesses.
Figure 10:
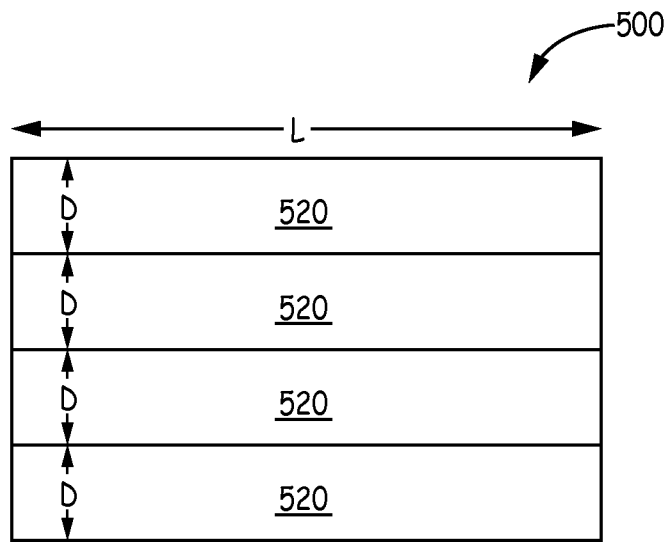
FIG. 10 is a cross sectional view of the filter assembly of FIG. 9 taken along lines 9-9'

FIG. 9 is a perspective view of a filter assembly 500 made in accordance with an implementation of the invention, the filter assembly 500 having a plurality of filtration recesses 520. FIG. 10 is a cross sectional view of the filter assembly of FIG. 9 taken along lines 9-9', showing the filter assembly 500 with recesses 520. The cross section shows the relative length "L" and diameter "D" of the filter assembly 500. Typically the length L is at least 1.5 times the diameter D, more commonly the length L is at least 2.0 times the diameter D. In some implementations the length L is at least 3.0 times the diameter D. The filter assembly 500 will typically have a sealed back end 522 covered by media, such as a scrim material or an electrostatic material covering a scrim material.

Figure 11A:
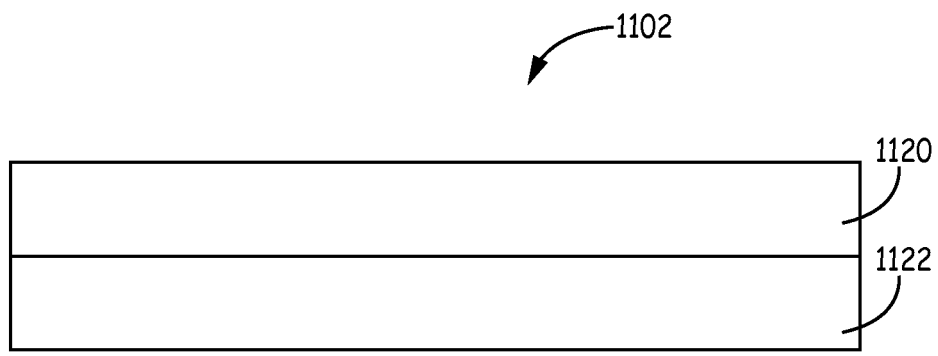
FIGS. 11A-11I are schematic depictions showing a method of making a filter assembly as described herein.
Figure 11B:
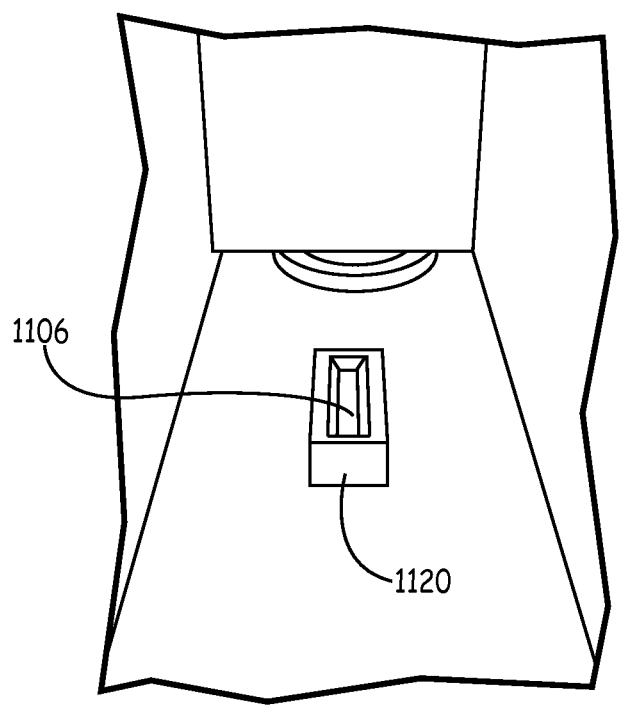
Figure 11C:
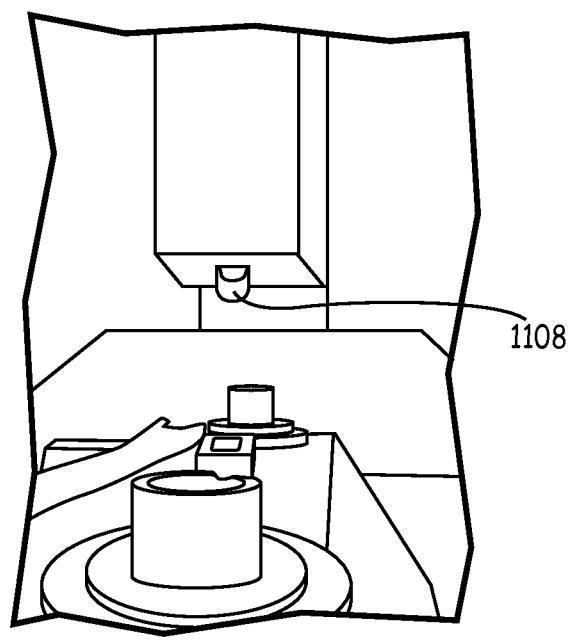
Figure 11D:
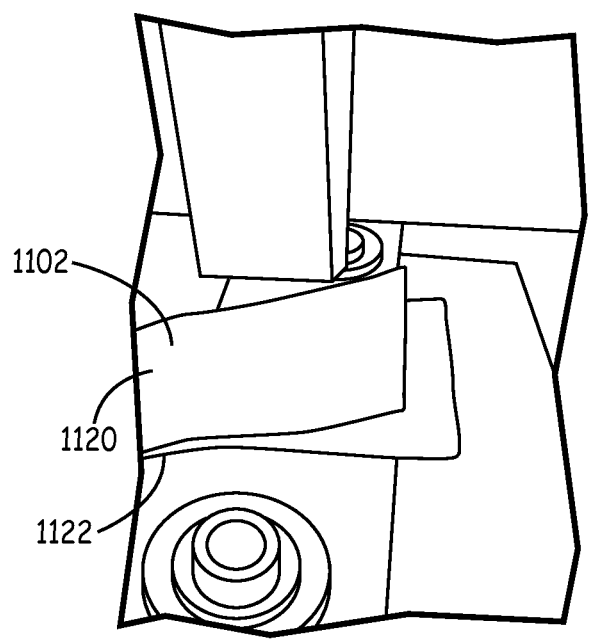
Figure 11E:
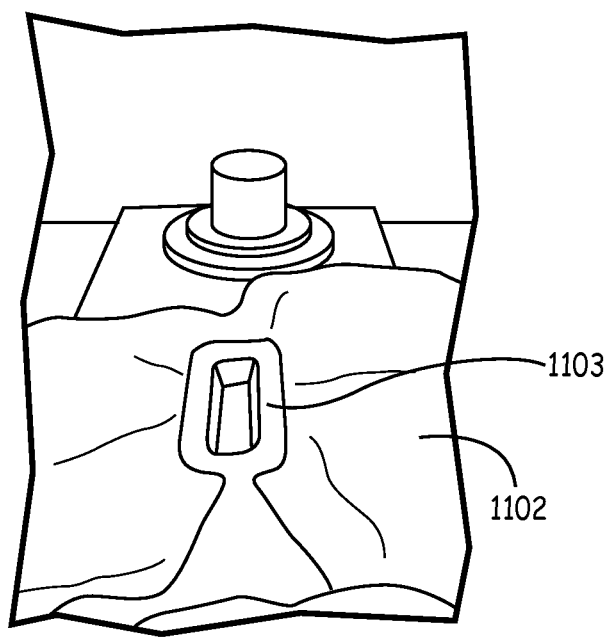

A method for making a filter assembly as described herein is shown schematically in FIGS. 11A to 11I. In the example method, a sheet of filter material 1102 is provided (FIG. 11A). The sheet of filter material 1102 can comprise an electrostatic layer 1120 and a support layer 1122 (such as a scrim layer). The sheet of filter material 1102 can be pressed into a desired configuration. The method can comprise the use of a nest 1104. The nest 1104 can comprise a recess 1106 (FIG. 11B). The recess 1106 can be shaped similarly to the desired final shape of the filter assembly. The method can comprise the use of a horn 1108 (FIG. 11C). The horn 1108 can have a similar shape as the desired final shape of the filter assembly. The sheet of filter material 1102 can be positioned between the horn 1108 and a nest 1104 (FIG. 11D).

The horn 1108 can be moved into a position where the horn 1108 is at least partially disposed within the recess 1106 of the nest 1104. The filter material 1102 can conform to the outer shape of the horn 1108 and the shape of the recess 1106. In an embodiment, sufficient force is applied to the filter material 1102 to permanently deform the filter material 1102. A small amount of heat or sonic energy is applied to melt some of the media to form a border 1103 that helps retain the shape.

The horn 1108 can be removed from a position where the horn 1108 is at least partially disposed within the recess 1106 (FIG. 11E) and the filter material 1102 can remain in a configuration closely resembling the configuration the filter material 1102 was in when the horn 1108 was at least partially disposed within the recess 1106.

Figure 11F:
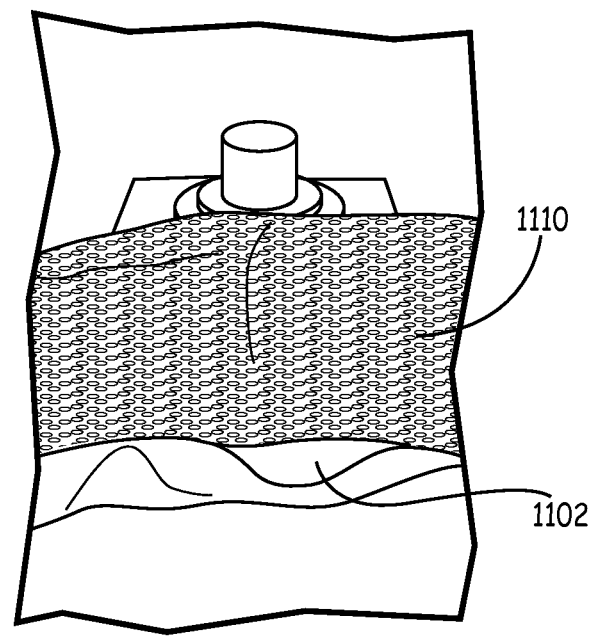
Figure 11G:
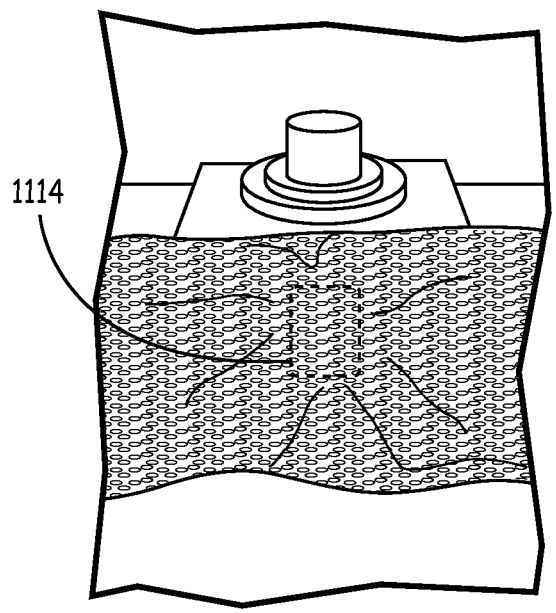
Figure 11H:
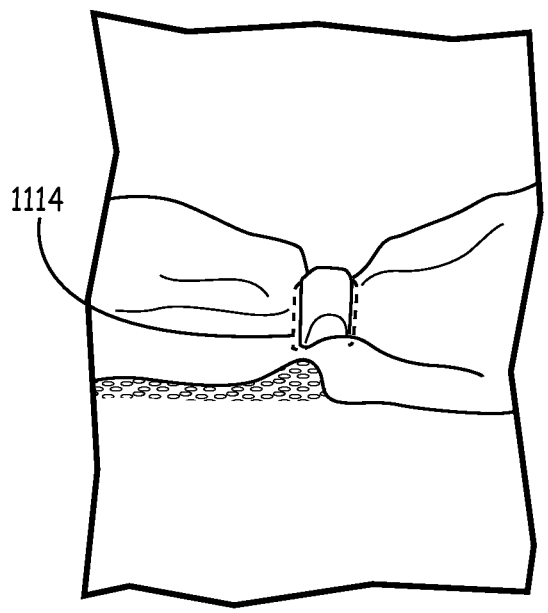
Figure 11I:
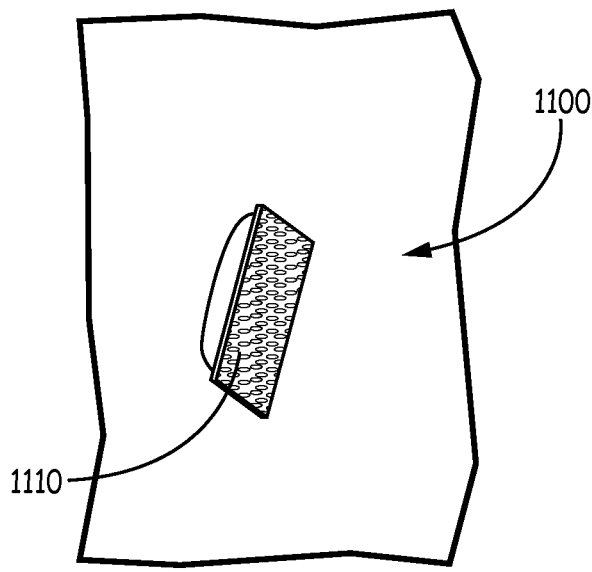

A screen layer 1110 can be placed on top of the filter material 1102, such as to sandwich the filter material 1102 between the nest 1104 and the screen layer 1110 (FIG. 11F). The screen layer 1110 can be welded, fused or otherwise bonded to the filter material 1102. In an embodiment, the filter material 1102 comprises an electrostatic layer 1120 and a support layer 1122 and when the screen layer 1110 is welded to the filter material 1102, the electrostatic layer 1120 can be welded to the support layer 1122. The filter assembly can be welded such as along line 1114. The filter assembly can be welded on a plurality of lines 1114. Any excess material beyond the weld line (FIG. 11H) can be removed from the filter assembly, such as by trimming, resulting in a filter assembly 1100 (FIG. 11I).

The screen layer 1110 can partially cover the open end of the filter assembly. The screen layer 1110 can allow air to pass through the screen layer and into the recess 1106 of the filter assembly. The screen layer 1110 can provide support, such as to aid the filter assembly in keeping a desired configuration.

Figure 11J:
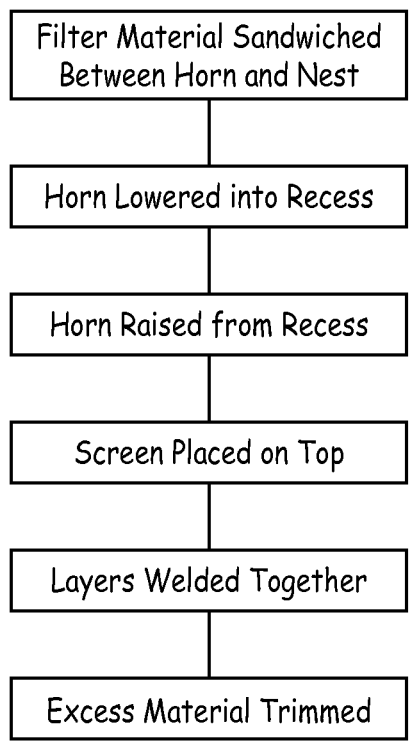
FIG. 11J is chart depicting a method of making a filter assembly as described herein

FIG. 11J shows a flow chart depicting a method of making a filter assembly. A filter material can comprise an electrostatic layer and a support layer. The filter material can be sandwiched between a horn and a nest. The horn can be lowered or otherwise moved into a recess in the nest, thereby configuring the filter material to a shape that substantially resembles the shape of the outer surface of the horn and the shape of the recess in the nest. The horn can be removed from the recess. The filter material can be configured to substantially retain its shape once the horn is removed from the recess. A screen layer can be place on top of the filter material. The screen layer can cover a portion of the open side of the filter material. The layers can be bonded, such as by welding, together. The filter assembly can be removed from the nest. Excess material can be removed from the filter assembly.

Figure 12A:
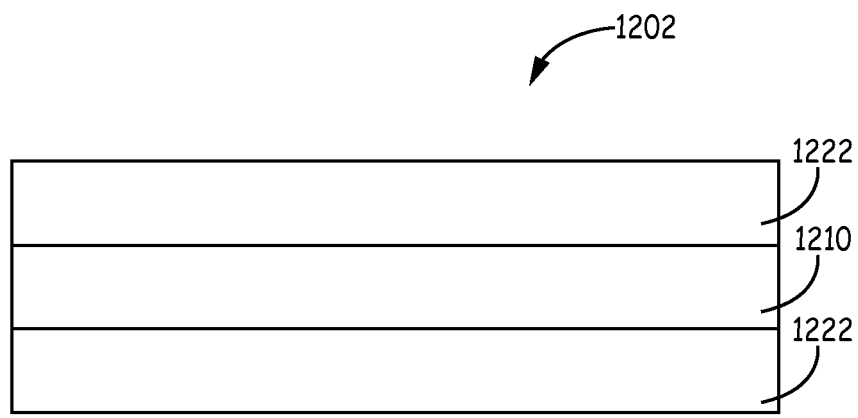
FIGS. 12A-12G are schematic depictions showing a method of making a filter assembly as described herein.
Figure 12B:
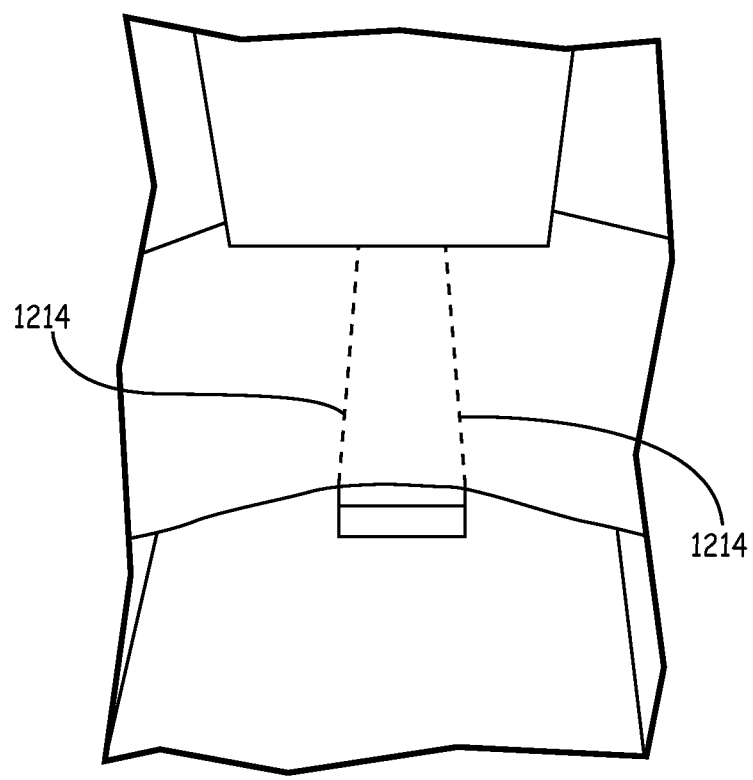

A method for making a filter assembly as described herein is shown schematically in FIGS. 12A to 12G. In this method a sheet of filter material 1202 is provided (FIG. 12A). The sheet of filter material 1202 can comprise an electrostatic layer 1220 and one or more support layer 1222 (such as a scrim layer). The sheet of filter material 1202 can be welded in one or more locations, such as along weld line 1214 (FIG. 12B). The distance between two weld lines 1214 can differ from a first sheet of filter material 1202 to a second sheet of filter material 1202.

Figure 12C:
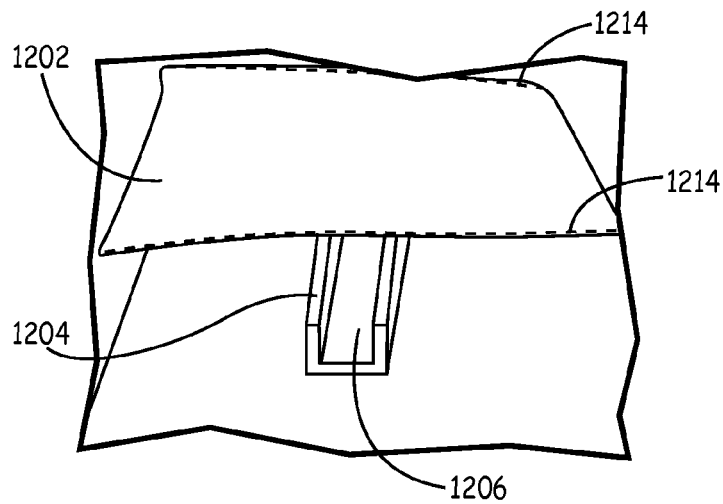

The method can also include the use of a nest 1204. The nest 1204 can comprise a recess 1206 (FIG. 12C). The recess 1206 can be shaped similarly to the desired final shape of the filter assembly. A first sheet of filter material 1202 can be placed on the nest 1202. The weld lines 1214 can be perpendicular to the nest 1204. The first sheet of filter material 1202 can be placed on the nest 1204, such that a portion of the recess 1206 is still exposed. In an embodiment an edge of the first filter sheet (such as a welded line 1214) is aligned with an edge of the nest 1204.

Figure 12D:
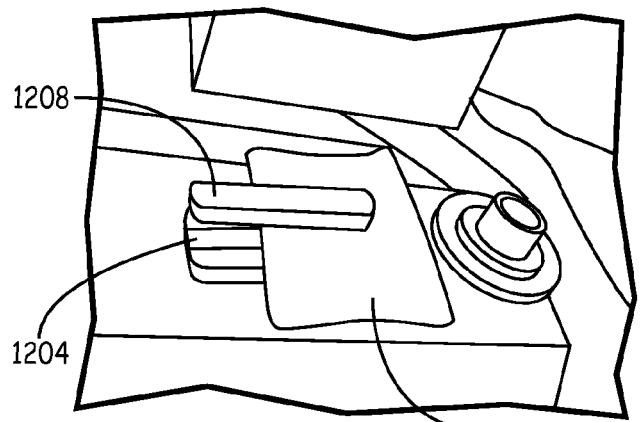
Figure 12E:
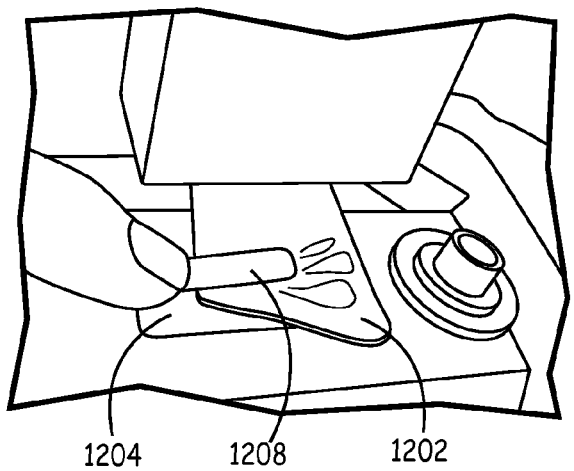

The method can comprise the use of a horn 1208 (FIG. 12D). The horn 1208 can have a similar shape as desired final shape of the filter assembly. The sheet of filter material 1202 can be positioned between the horn 1208 and a nest 1204. The horn 1208 can be pressed into the recess 1206, such as to configure the filter material 1202 into a shape that closely resembles the recess 1206 and the horn 1208 (FIG. 12E).

Figure 12F:
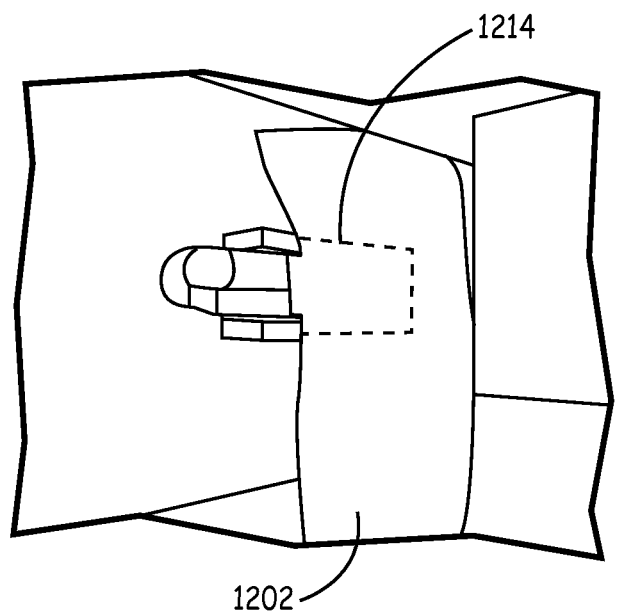
Figure 12G:
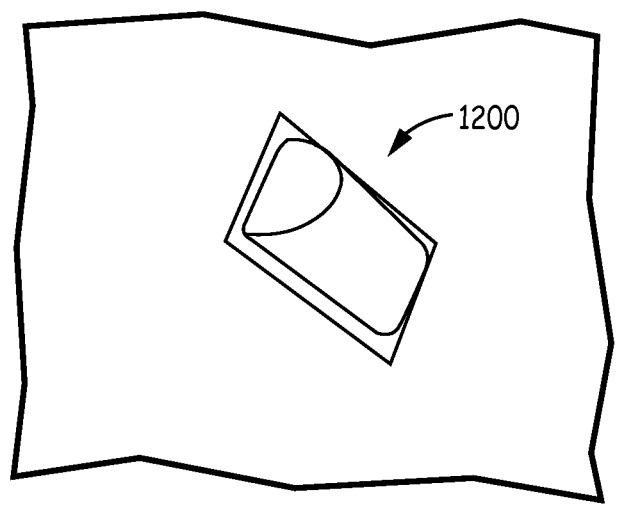

A second sheet of filter material 1202 can be placed on top of the first sheet of filter material 1202, such as to sandwich the horn 1208 in between (FIG. 12F). The first sheet of filter material 1202 can be bonded to the second sheet of filter material 1202, such as by welding along lines 1214. The horn 1208 can be removed from the recess 1206, such as through the open end of the filter assembly. Removing the horn 1208 can define the recess in the filter assembly. Excess material 1216 can be removed from the filter assembly, such as by trimming it, resulting in a filter assembly 1200 (FIG. 12G).

Figure 12H:
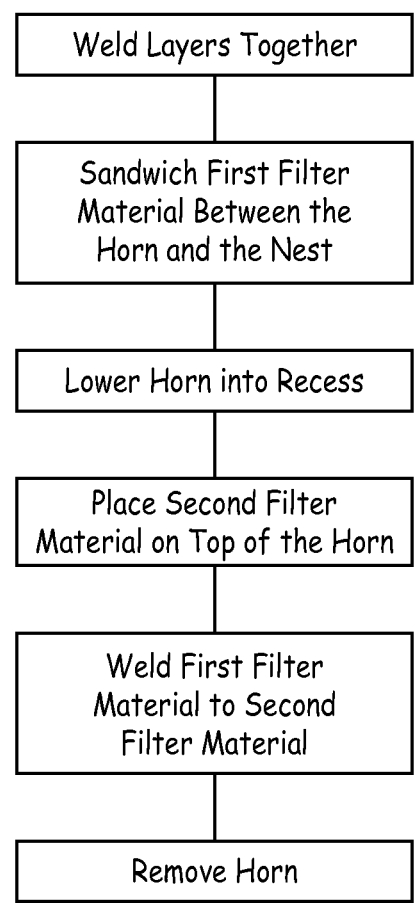
FIG. 12H is chart depicting a method of making a filter assembly as described herein While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure and claims.

FIG. 12H shows a flow chart depicting a method of making a filter assembly. A filter material can comprise a layer of electrostatic sandwiched between two support layers (such as two scrim layers). A filter material can include two weld lines, such as one at the front portion of the filter assembly and one at the back portion of the filter assembly. The two weld lines can be parallel. A first sheet of filter material can be disposed on a nest. The nest can comprise a recess. The two weld lines can be positioned perpendicular to the recess. A horn can be inserted into the recess, such as to form the first sheet filter material to closely match the shape of the horn and the recess.

A second sheet of filter material can be disposed on top of the horn and on a portion of the first sheet of filter material. The second sheet of filter material can comprise two weld lines. The weld lines on the second sheet of filter material can be aligned with the weld lines on the first sheet of filter material. The first sheet of filter material can be bonded to the second sheet of filter material, such as by welding.

The horn can be removed from the recess, such as to define a recess in the filter assembly. The filter assembly can be removed from the nest. Excess material can be removed from filter assembly, such as by trimming.

Experiments

In order to evaluate the performance of filters made in accordance with the present invention, comparisons were made between two comparative recirculation filter elements, and two filter elements made in accordance with the present disclosure.

In the first comparative example, the filter element was a substantially planar recirculation filter with a polypropylene scrim overlying an electrostatic media. The polypropylene scrim had a permeability of approximately 300 feet per minute at 0.5 inches of water. The electrostatic media had a permeability of approximately 400 feet per minute at 0.5 inches of water. The filter element did not contain an adsorbent material.

In the second comparative example, the filter element also was a substantially planar recirculation filter with a polypropylene scrim overlying an electrostatic media. The polypropylene scrim had a permeability of approximately 500 feet per minute at 0.5 inches of water. The electrostatic media had a permeability of approximately 400 feet per minute at 0.5 inches of water. The filter element did not contain an adsorbent material.

In the single recess filter, a filter element made in accordance with the present disclosure was produced, the filter element having a substantially conical shape. The filter element included an electrostatic media overlying a polypropylene scrim on the interior of the filter element. The electrostatic media had a permeability of approximately 400 feet per minute at 0.5 inches of water. The polypropylene scrim had a permeability of approximately 500 feet per minute at 0.5 inches of water. The filter element did not contain an adsorbent material.

In the multiple recess filter, a filter element made in accordance with the present disclosure was produced, the filter element had multiple elongate recesses that were substantially parallel to one another. The filter element included an electrostatic media overlying a polypropylene scrim on the interior of the filter element. The electrostatic media had a permeability of approximately 400 feet per minute at 0.5 inches of water. The polypropylene scrim had a permeability of approximately 500 feet per minute at 0.5 inches of water. The filter element did not contain an adsorbent material.

TABLE 1

| | Percent of Particles Reflected | Percent of Particles Trapped | Percent of Particles that Fall Out View | Ratio of Trapped to Reflected Particles |
|---|---|---|---|---|
| Comparative Example 1 | 38.0 | 29.0 | 33.0 | .76 |
| Comparative Example 2 | 35.0 | 16.0 | 49.0 | .46 |
| Single Recess Filter | 34.2 | 26.7 | 39.2 | .78 |
| Multiple Recess Filter | 20.0 | 48.3 | 31.7 | 2.42 |

As indicated in Table 1, the filter constructions with recesses and exposed electrostatic had lower particle reflection rates, and also had higher ratios of trapped to reflected particles. Table 1 shows that that the percent of particles reflected from the filter elements was lower for the two elements made in accordance with the present disclosure than the two comparative examples: 20.0 and 34.2 compared to 35.0 and 38.0. In addition, both filter elements made in accordance with the present disclosure showed a higher ratio of trapped to reflected particles: 2.42 and 0.78 compared to 0.76 and 0.46. Thus, the two example elements made in accordance with present disclosure demonstrated improved removal of particulate contaminants compared to the two comparative examples.

The above specification provides a complete description of the manufacture and use of the invention. Since many embodiments of the invention can be made without departing from the spirit and scope of the invention the invention resides in the claims hereinafter appended.

The invention claimed is:

1. A filter assembly for use in an electronic enclosure, the filter assembly comprising:
    a media structure including a substantially open front face, a closed rear face, and an internal recess between the open front face and closed rear face;
    a scrim material forming at least a portion of the media structure; and
    an electrostatic material disposed within the internal recess of the filter assembly, the electrostatic material at least partially covering the scrim.

2. The filter assembly of claim 1, wherein the scrim material comprises a woven material.

3. The filter assembly of claim 1, wherein the scrim material comprises a non-woven material.

4. The filter assembly of claim 1, wherein the scrim material comprises polypropylene fibers.

5. The filter assembly of claim 1, wherein the scrim material has a permeability of between about 100 ft./min. at 0.5 inches of water and about 800 ft./min. at 0.5 inches of water.

6. The filter assembly of claim 1, wherein the internal recess of the filter assembly has a ratio of maximum length to maximum diameter of the open front face of at least 1.0.

7. The filter assembly of claim 1, wherein the internal recess of the filter assembly has an internal surface area that is at least 2 times the area at the open front face.

8. The filter assembly of claim 1, wherein at least 50 percent of the surface area of the internal recess has an angle to the opening that is less than or equal to 45 degrees.

9. The filter assembly of claim 1, wherein at least 50 percent of the surface area of the internal recess has an angle to the opening that is less than or equal to 30 degrees.

10. The filter assembly of claim 1, wherein the filter assembly comprises a plurality of structures including an open front face, a closed rear face, and a plurality of internal recesses between the open front face and closed rear face.

11. A filter assembly for use in an electronic enclosure, the filter assembly comprising:
    a media structure including a substantially open front end, a closed rear end, and a plurality of internal recesses between the open front face and closed rear face;
    a scrim material forming at least a portion of the internal recesses; and
    an electrostatic material disposed within the internal recesses of the filter assembly, the electrostatic material at least partially covering the scrim.

12. The filter assembly of claim 11, wherein the scrim material comprises woven material.

13. The filter assembly of claim 11, wherein the electrostatic material has a filtering efficiency of about 20% to about 99.99% for 20 to 30 micron particulate contaminants.

14. The filter assembly of claim 11, wherein at least one of the plurality of internal recesses has a ratio of maximum length to maximum diameter of the open front face of at least 1.0.

15. The filter assembly of claim 11, wherein at least one of the plurality of internal recesses has an internal surface area that is at least 2 times the area at the open front face.

16. The filter assembly of claim 11, wherein at least one of the plurality of internal recesses has an internal surface area that is at least 4 times the area at the open front face.

17. The filter assembly of claim 11, wherein at least one of the plurality of internal recesses has an internal surface area that is at least 6 times the area at the open front face.

18. The filter assembly of claim 11, wherein at least 50 percent of the surface area of at least one internal recess has an angle to the opening that is less than or equal to 45 degrees.

19. The filter assembly of claim 11, wherein at least 50 percent of the surface area of at least one internal recess has an angle to the opening that is less than or equal to 30 degrees.

20. A disk drive assembly, the disk drive assembly comprising:
    (a) a disk drive housing that defines an enclosure;
    (b) at least one disk rotatably mounted within the enclosure, wherein rotation of the at least one disk induces airflow within the enclosure; and
    (c) a filter assembly disposed within the enclosure, wherein the filter assembly comprises:
    a media structure including a substantially open front face, a closed rear face, and an internal recess between the open front face and closed rear face;
    a scrim material forming at least a portion of the media structure;
    an electrostatic material disposed within the internal recess of the filter assembly, the electrostatic material at least partially covering the scrim material.

* * * * *